(12) United States Patent
Gurvich et al.

(10) Patent No.: US 11,480,528 B2
(45) Date of Patent: Oct. 25, 2022

(54) AND INSPECTION METHOD OF AIRCRAFT DRIVE SHAFTS

(71) Applicant: Hamilton Sundstrand Corporation, Charlotte, NC (US)

(72) Inventors: Mark R. Gurvich, Middletown, CT (US); Georgios S. Zafiris, Glastonbury, CT (US); Brayton Reed, Rome, NY (US); Joyel M. Schaefer, Earlville, NY (US); Michael King, Sauquoit, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1063 days.

(21) Appl. No.: 16/146,526

(22) Filed: Sep. 28, 2018

(65) Prior Publication Data
US 2020/0103351 A1 Apr. 2, 2020

(51) Int. Cl.
| | | |
|---|---|---|
| G01N 21/88 | (2006.01) | |
| G01N 21/91 | (2006.01) | |
| F16C 3/02 | (2006.01) | |
| G01N 21/64 | (2006.01) | |
| G01N 21/84 | (2006.01) | |

(52) U.S. Cl.
CPC ......... G01N 21/8803 (2013.01); F16C 3/026 (2013.01); G01N 21/643 (2013.01); G01N 21/6447 (2013.01); G01N 21/91 (2013.01); F16C 2326/06 (2013.01); G01N 2021/8472 (2013.01)

(58) Field of Classification Search
CPC ............... G01N 21/8803; G01N 21/91; G01N 21/6447; G01N 21/643; F16C 3/026; F16C 2326/06; F16D 1/06; F16D 2300/18; B64D 35/00; B64F 5/40; B64C 27/12

See application file for complete search history.

(56) References Cited

U.S. PATENT DOCUMENTS

| | | | | |
|---|---|---|---|---|
| 4,899,596 A | * | 2/1990 | Janik | G01L 25/003 73/1.11 |
| 5,456,123 A | * | 10/1995 | Parkinson | G01L 3/12 73/1.09 |
| 6,150,656 A | | 11/2000 | Garrity | |
| 6,268,676 B1 | * | 7/2001 | Brunken, Jr. | F16F 15/10 248/609 |
| 6,364,772 B1 | * | 4/2002 | Sugden | F16D 9/02 464/158 |
| 7,271,894 B2 | | 9/2007 | Devitt et al. | |

(Continued)

OTHER PUBLICATIONS

Hegne et al., "Design and Power Transmission of Advanced Light Helicopter", International Journal of Engineering Research and Applications (IJERA), vol. 3, Issue 4, Jul.-Aug. 2013, pp. 219-223.
Anonymous: "Advanced Automotive Drive Train Troubleshooting and Overhaul", XP055666380, Jul. 25, 2018; Retrieved from the Internet: Url:https://www.waybuilder.net/free-ed/SkilledTrades/Automotive/08AdvTroubleTrans/08AdvTroubleTrans.asp [retrieved on Feb. 7, 2020].

(Continued)

*Primary Examiner* — Sang H Nguyen

(74) *Attorney, Agent, or Firm* — Cantor Colburn LLP

(57) ABSTRACT

An easily inspected shaft assembly is provided and includes a shaft, a sleeve receptive of a portion of the shaft and an optically activatable layer including first and second sections disposed on respective exterior surfaces of the shaft and the sleeve, respectively, such that the first and second sections move relative to one another as the shaft and the sleeve move relative to one another.

20 Claims, 6 Drawing Sheets

(56) References Cited

U.S. PATENT DOCUMENTS

| | | | |
|---|---|---|---|
| 7,510,377 B1* | 3/2009 | Carter, Jr. ............... | B64C 39/04 |
| | | | 416/104 |
| 8,118,064 B2 | 2/2012 | Nakajima et al. | |
| 8,316,705 B2 | 11/2012 | Wong et al. | |
| 2005/0196275 A1* | 9/2005 | Carson ..................... | F03B 1/00 |
| | | | 415/211.2 |
| 2005/0200219 A1* | 9/2005 | Brunken ................. | F16F 15/10 |
| | | | 248/609 |
| 2011/0147091 A1* | 6/2011 | Bullin ..................... | E21B 7/068 |
| | | | 175/107 |
| 2015/0048213 A1* | 2/2015 | Ross ..................... | B64C 29/0033 |
| | | | 244/7 A |
| 2017/0037910 A1* | 2/2017 | Schwartz ................ | F16C 3/035 |
| 2017/0356849 A1 | 12/2017 | Henderkott | |
| 2018/0138761 A1* | 5/2018 | Niergarth ............... | H02K 1/187 |

OTHER PUBLICATIONS

Anonymous: "Schrauben markieren/sicherungsdraht/wie machtihr er?—racing4fun.de", XP055665404, Jun. 1, 2016; pp. 1-5; Retrieved from the Internet: Url:https://www.racing4fun.de/forum/viewtopic.php?t=41889 [retrieved on Feb. 5, 2020].

Anonymous: "So SAD-93 All Trac Front Axel preventing SAD shaft removal—p. 2", XP055665486, Apr. 5, 2016; pp. 8-15; Retrieved from the Internet: Url:https://www.toyotavantech.com/forum/showthread.php?436-So-SAD-93-All-Trac-Front-Axel-preventing-SAD-shaft-removal/page2 [retrieved on Feb. 5, 2020].

European Search Report Application No. EP19196344; dated Feb. 17, 20; pp. 13.

* cited by examiner

AND INSPECTION METHOD OF AIRCRAFT DRIVE SHAFTS

BACKGROUND

The following description relates to aircraft drive shafts and, more specifically, to a design and inspection method for use with aircraft drive shafts.

Aircraft drive shafts (DS) are provided in drive systems of various types of aircrafts, such as rotary-wing aircrafts (helicopters) or fixed-wing aircrafts (airplanes). In a typical case of a rotary-wing aircraft, an aircraft DS is disposed within a helicopter to transmit engine torque from the helicopter engine at or near the main rotor, along the length of the helicopter body and the tail and to the intermediate gearbox at the end of the tail. An additional DS transmits the engine torque from the intermediate gearbox to the tail gearbox where the engine torque is used to drive rotations of the tail rotor.

In the typical case described above, at least the aircraft DS can include one or multiple sections that are connected in a linear arrangement by multiple joints and connections. At each joint and connection, a shaft segment of a section is received within a sleeve segment and the two are fastened together. This relative complexity can lead to a relatively high risk of damage, especially when lightweight but sensitive composite materials are used, and severe consequences in cases of failure.

As such, it is often necessary to inspect and sometimes necessary to repair or replace the joints and connections or the shafts themselves. However, since it is usually the case that an aircraft DS is located in a confined space within the helicopter, reliable and affordable inspections can be difficult to perform.

BRIEF DESCRIPTION

According to an aspect of the disclosure, an easily inspected shaft assembly is provided and includes a shaft, a sleeve receptive of a portion of the shaft and an optically activatable layer including first and second sections disposed on respective exterior surfaces of the shaft and the sleeve, respectively, such that the first and second sections move relative to one another as the shaft and the sleeve move relative to one another.

In accordance with additional or alternative embodiments, at least one of the shaft and the sleeve includes at least one of metallic materials and composite materials.

In accordance with additional or alternative embodiments, the shaft is secured between the sleeve and an additional member.

In accordance with additional or alternative embodiments, the optically activatable layer includes at least one of fluorescent, absorbent and reflective material, coating or paint.

In accordance with additional or alternative embodiments, the optically activatable layer is provided in an array of one or more stripes of uniform and/or variable geometries arranged around the shaft and the sleeve and the one or more stripes are parallel with and/or angled relative to a central longitudinal axis of the shaft and the sleeve.

In accordance with additional or alternative embodiments, one or more connections to secure the sleeve and the shaft together.

In accordance with additional or alternative embodiments, an aircraft is provided and includes an engine, a gearbox disposed remotely from the engine and a drive shaft (DS) configured to transmit torque produced by the engine to the gearbox. The assembly is provided as one or more assemblies disposed along a length of the DS.

According to an aspect of the disclosure, an easily inspected shaft assembly is provided and includes a housing including an extension, a shaft which is receptive of a portion of the extension, a cover and an optically activatable layer including first and second sections disposed on respective exterior surfaces of the shaft and the cover, respectively, such that the first and second sections move relative to one another as the shaft and the cover move relative to one another.

In accordance with additional or alternative embodiments, at least one of the shaft, the cover and the housing includes at least one of metallic materials and composite materials.

In accordance with additional or alternative embodiments, the optically activatable layer includes at least one of fluorescent, absorbent and reflective material, coating or paint.

In accordance with additional or alternative embodiments, the optically activatable layer is provided in an array of one or more stripes of uniform and/or variable geometries arranged around the shaft and the cover and the one or more stripes are parallel with and/or angled relative to a central longitudinal axis of the shaft and the cover.

In accordance with additional or alternative embodiments, the cover is formed to define one or more apertures.

In accordance with additional or alternative embodiments, the optically activatable layer further includes an additional section disposed on a portion of the exterior surface of the shaft exposed by the one or more apertures.

In accordance with additional or alternative embodiments, the cover is formed to define an array of one or more apertures around the shaft and the optically activatable layer is provided in an array of one or more stripes arranged around the shaft and the cover with each of the one or more stripes extending into a corresponding aperture.

In accordance with additional or alternative embodiments, one or more first connections to secure the shaft and the extension together and one or more second connections to secure the housing and the cover together.

In accordance with additional or alternative embodiments, an aircraft is provided and includes an engine, a gearbox disposed remotely from the engine and a drive shaft (DS) configured to transmit torque produced by the engine to the gearbox. The assembly is provided as one or more assemblies disposed along a length of the DS.

According to another aspect of the disclosure, a method of inspecting a joint at which first and second members are at an initial relative position is provided. The method includes applying an optically activatable layer to the joint. The applying includes disposing first and second sections of the optically activatable layer on respective exterior surfaces of the first and second members, respectively, such that the first and second sections move relative to one another with relative first and second member movement. The method further includes activating the optically activatable layer to optically ascertain, from relative positions of the first and second sections, a secondary relative position of the first and second members, comparing the secondary and the initial relative positions and determining whether the joint of the DS exhibits a precursory damage indication in accordance with results of the comparing.

In accordance with additional or alternative embodiments, the activating, the comparing and the determining are repeated periodically following a predefined delay subsequent to the applying.

In accordance with additional or alternative embodiments, the optically activatable layer includes at least one of fluorescent, absorbent and reflective material, coating or paint and the activating of the optically activatable layer includes emitting light toward the optically activatable layer.

In accordance with additional or alternative embodiments, the determining that the joint of the DS exhibits the precursory damage indication is in accordance with the results of the comparing indicating that the secondary and the initial relative positions are different by a threshold amount.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a periodic inspection method is provided for drive shaft (DS) joints, especially those including advanced fiber-reinforced polymer-matrix composite materials, where a high risk of damage exists and severe consequences would be expected in cases of failure. The periodic inspection method is based on an application of at least one of fluorescent, absorbing and reflecting material at external surfaces of metallic parts of the joints (i.e., the sleeves) and at external composite surfaces (i.e., shafts) to monitor boundary gaps where the applied at least one of fluorescent, absorbing and reflecting material effectively serves as a precursor indicator of potential progressive damages. Upon the application of the at least one of the fluorescent, absorbing and reflecting material, this material will provide for optical indications that can reveal gaps and/or misalignments which can be followed up by more systematic inspections.

Figure 1A:
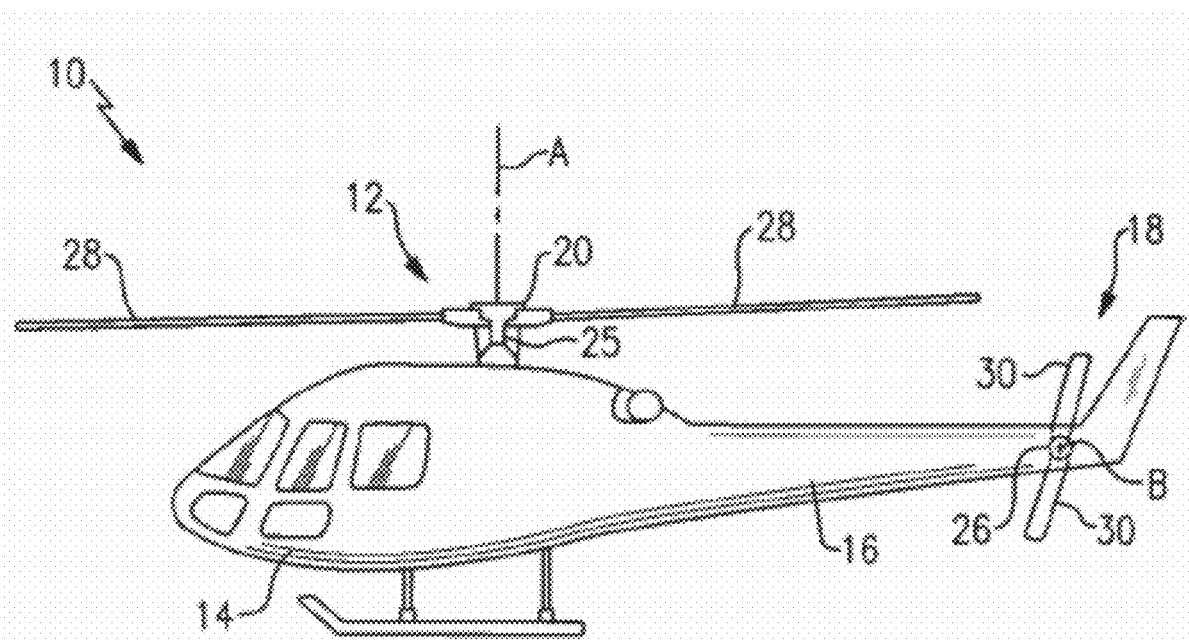
FIG. 1A is a side view of an aircraft in accordance with embodiments.
Figure 1B:
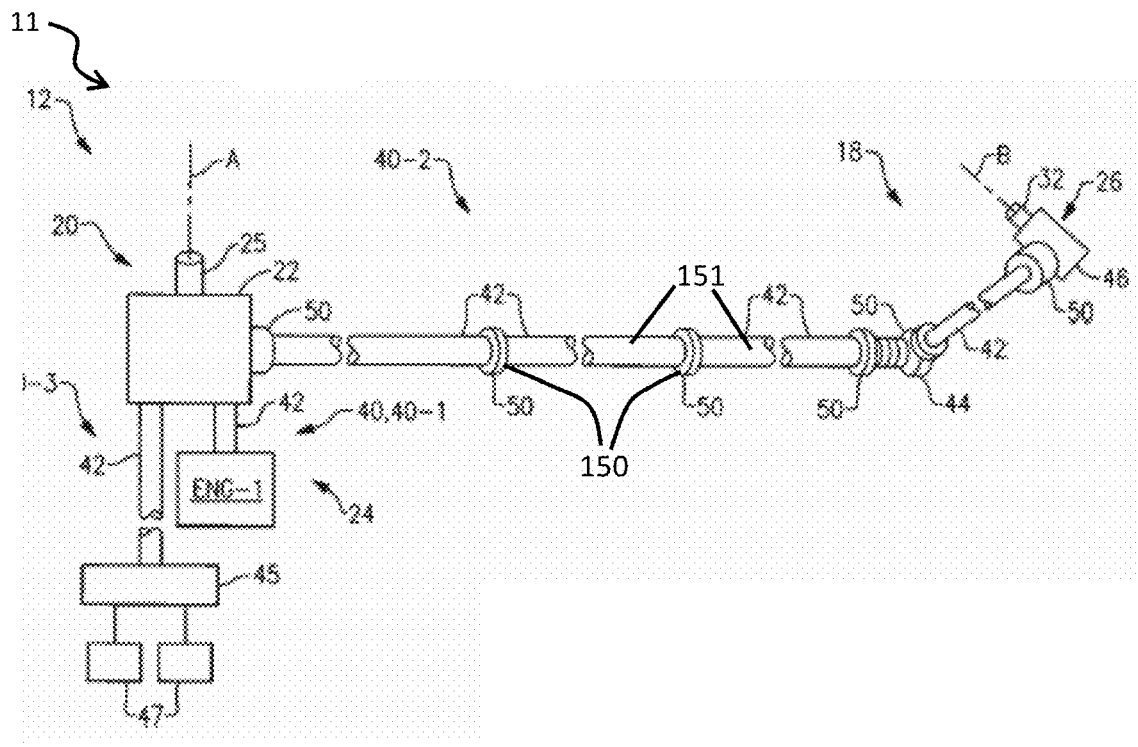
FIG. 1B is a side view of a transmission system of the aircraft of FIG. 1A in accordance with embodiments.
Figure 1C:
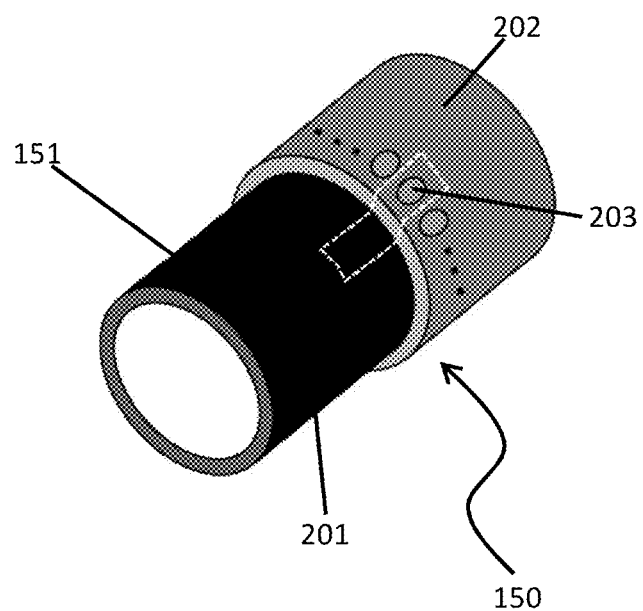
FIG. 1C is a perspective view of a shaft end joint of the aircraft of FIG. 1A.

With reference to FIGS. 1A, 1B and 1C, an aircraft 10 includes a power transmission system 11 (see FIG. 1B), a main rotor assembly 12 supported by an airframe 14. The airframe 14 includes an extending tail 16 which mounts a tail rotor assembly 18. The main rotor assembly 12 includes a main rotor 20 driven about a first axis of rotation A through a main rotor gearbox 22 by a power plant system 24.

The power plant system 24 generates power available for flight operations. The power plant system 24 includes one or more engine packages to drive a main rotor hub 25 of the main rotor 20 and a tail rotor 26 of the tail rotor assembly 18. The power plant system 24 can include at least one engine package ENG1. Each engine package ENG1 can include a gas turbine engine. Gas turbine engines are known and include a combustor and one or more rotatable spools. Each spool can include a turbine driving a compressor and/or an output of the engine.

The main rotor 20 includes a plurality of rotor blades 28 mounted or otherwise secured to the main rotor hub 25. The rotor blades 28 are rotatable about the first axis of rotation A to provide propulsion for the aircraft 10. The tail rotor 26 includes a plurality of rotor blades 30 mounted or otherwise secured to a tail rotor hub 32. The rotor blades 30 are rotatable about a second axis of rotation B to counteract torque generated by rotation of the rotor blades 28.

Although a particular rotary-wing aircraft configuration is illustrated and described herein, other configurations such as vertical-lift fan, turbo-prop, tilt-rotor, tilt-wing and fixed-wing aircraft and other systems including wind turbines, industrial power machinery and shipboard couplings can also benefit from the teachings herein.

The power transmission system 11 can include one or more drive assemblies to interconnect the power plant system 24 and the rotors 20, 26. The power transmission system 11 includes one or more drive assemblies 40, including drive assemblies 40-1 to 40-3. Each drive assembly 40 includes one or more DSs 42. In the illustrated example, DS 42 of drive assembly 40-1 couples the engine package ENG1 to the main rotor gearbox 22.

Drive assembly 40-2 interconnects the power plant system 24 and the tail rotor 26. Drive assembly 40-2 includes a plurality of DSs 42 that couple the main rotor gearbox 22 to an intermediate gearbox 44 and a tail gearbox 46 to drive the tail rotor 26. Gearboxes 44, 46 drive the respective rotor blades 30 in response to torque communicated by the engine package ENG1.

Each DS 42 can include one more couplings 50. Each coupling 50 can be a portion of another aircraft component such as a bearing hanger or gearbox, for example. Each coupling 50 can be mechanically attached or otherwise secure the drive shaft 42 to other portions of the power transmission system 11, such as adjacent DSs 42, gearboxes 22, 44, 46 and engine package ENG1. Each gearbox 22, 44, 46 is operable to change a speed and torque of an input to the gearbox 22, 24, 46, and can include an epicyclic gear arrangement having a set of gears, for example.

The DSs 42 can interconnect or otherwise couple other portions of the aircraft 10. For example, the power transmission system 11 can include an accessory gearbox 45 that drives one or more aircraft components or accessories 47. Drive assembly 40-3 includes at least one DS 42 that serves as a power takeoff (PTO) shaft to interconnect the accessory gearbox 45 and power plant system 24. Example accessories include starters, generators, hydraulic and fuel pumps and environmental control systems.

The DSs 42 can includes multiple shaft assemblies or end joints 150 that connect sequential DS sections 151 and are disposed and configured to transmit substantial amounts of torque. As such, the multiple shaft end joints 150 and the DS sections 151 often experience stresses that can damage the components of the multiple shaft end joints 150 and the DS sections 151. The location of the DSs 42 relative to the aircraft 10 and the outer skin of the airframe 14 can make inspection of the multiple shaft end joints 150 and the DS sections 151 difficult.

Figure 2A:
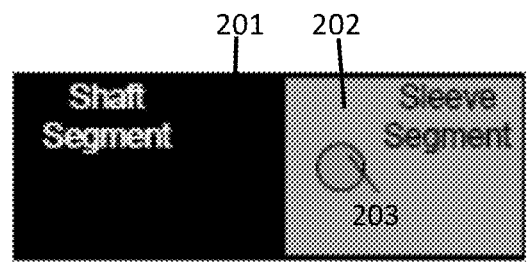
FIG. 2A is a schematic side view of a periodic segment of a shaft end joint at a first time.
Figure 2B:
FIG. 2B is a schematic side view of the periodic segment of the shaft end joint of FIG. 2A at a later time.
Figure 2C:
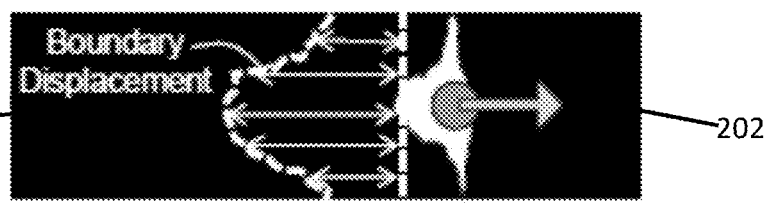
FIG. 2C is a schematic side view of the periodic segment of the shaft end joint of FIG. 2B at a later time.
Figure 3:
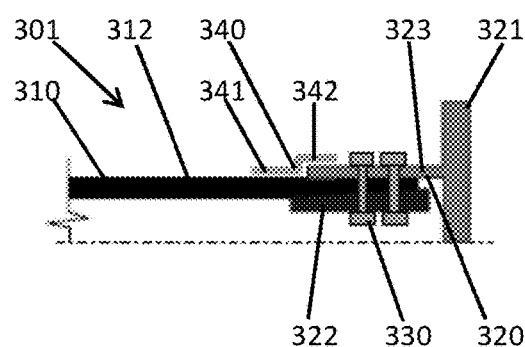
FIG. 3 is schematic axial cross-sectional view of a shaft end joint in accordance with embodiments.
Figure 4:
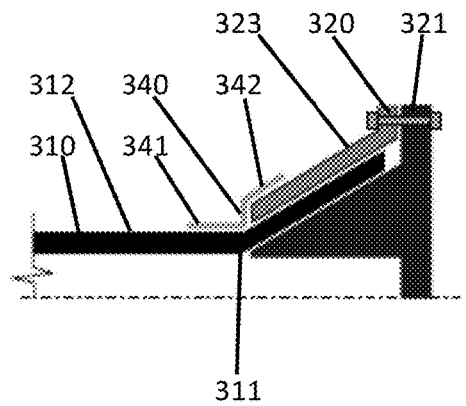
FIG. 4 is schematic axial cross-sectional view of a shaft end joint in accordance with embodiments.

With reference to FIGS. 2A, 2B and 2C, the stress and damage that is potentially experienced by one of the multiple shaft end joints 150 (see FIG. 1C) is illustrated. As shown in FIG. 2A, shaft periodic segment 201 is received within sleeve segment 202 and connection 203, which can be provided as a radial fastener, a bolt, a pin or a rivet or as adhesive or glue, is used to secure the shaft periodic segment 201 to the sleeve segment 202. At a certain point in time, as shown in FIG. 2B which is an example of axial tensile loading, initial micro-damages due to stress concentrations 204 are formed proximate to the connection 203 but would be invisible to an inspection as they would be hidden by the sleeve segment 202. At a next point in time, as shown in FIG. 2C which is a further example of continued axial tensile loading, increased stress concentrations have given way to a crack that resulted in the excessive deformation and the movement of the original boundary between the shaft periodic segment 201 and the sleeve segment 202.

Damages in one or several locations around connections (i.e., radial fasteners) are usually not sufficient to be considered as limits of structural integrity of the entire shaft configurations. However, they can serve as a valuable precursor of their complete failure under increased load or expanded duration of the load, with clear indications of excessive deformation in at least one or some areas near the original shaft/sleeve boundary.

Thus, with reference to FIGS. 3-11, easily inspected shaft assemblies or end joints (hereinafter referred to as "shaft assemblies") 301 (see FIGS. 3-7) and 801 (see FIGS. 8-11) are provided and allow for inspections that can identify issues well before the complete limit of structural integrity of the entire shaft is reached.

The shaft assembly 301 includes a shaft 310 that can be made of metallic or composite materials, an external sleeve 320 that is coupled to a housing 321 and is formed to be receptive of a portion of the shaft 310, a connection 330 and an optically activatable layer 340. The connection 330 is disposed to extend through at least the sleeve 320 to secure the sleeve 320 and the shaft 310 together or to secure the shaft 310 between the sleeve 320 and an insert 322 (see FIG. 3). The shaft 310 can be substantially straight (i.e., with constant diameter) or provided with a conically-shaped section 311 (see FIG. 4). In cases of joints with conical end-section shapes (shown in FIG. 4 as an example), joints can also be implemented without connections (i.e., radial fasteners), since such wedge-type joints are able to transfer axial load including tension.

The optically activatable layer 340 can be provided as at least one of fluorescent, absorbing and reflecting material, coating or paint that glows or shows dark as a result of electromagnetic radiation being emitted toward it or another similar feature that can be optically activated by light of a corresponding spectrum (e.g., ultra-violet or simply visible). The optically activatable layer 340 includes a first section 341 and a second section 342. The first section 341 is disposed on an exterior surface 312 of the shaft 310 and the second section 342 is disposed on an exterior surface 323 of the sleeve 320. The first and second sections 341 and 342 move relative to one another as the shaft 310 and the sleeve 320 move relative to one another and thus provide optical indications as to an amount of stress and strain and/or internal damage the shaft assembly 301 has experienced.

Figure 5:
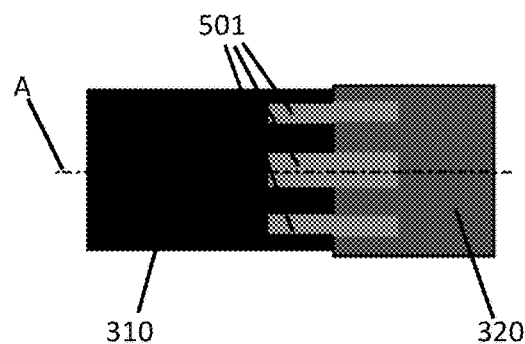
FIG. 5 is schematic side view of an array of stripes of a shaft end joint in accordance with embodiments.
Figure 6:
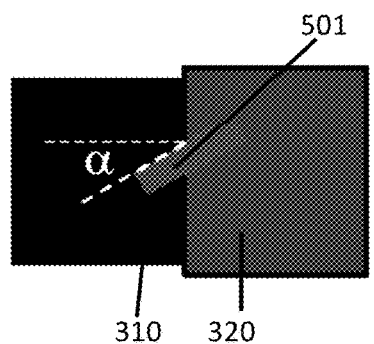
FIG. 6 is schematic side view of an angled stripe of a shaft end joint in accordance with embodiments.

As shown in FIGS. 5 and 6, the optically activatable layer 340 can be provided in an array of stripes 501 that is arranged around the shaft 310 and the sleeve 320. These stripes 501 can be parallel with a central longitudinal axis A of the shaft 310 and the sleeve 320 (see FIG. 5) or angled relative to the central longitudinal axis A (see FIG. 6). The stripes can have uniform or variable geometries and may be placed with uniform or variable distances from one another.

Figure 7:
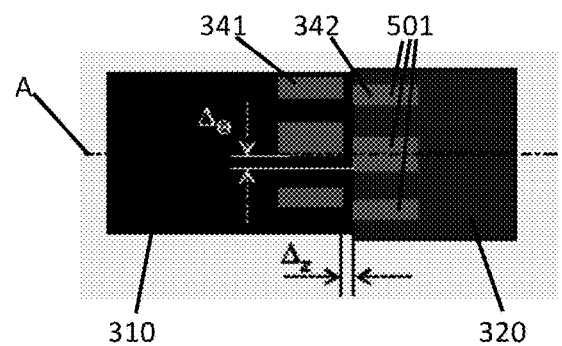
FIG. 7 is schematic side view of an array of stripes exhibiting axial tensile and torsional deformations of a shaft end joint in accordance with embodiments.

As shown in FIG. 7, whether the stripes 501 are parallel or angled with respect to the central longitudinal axis A, relative movement between the shaft 310 and the sleeve 320 will result in a corresponding relative displacement of the first section 341 and the second section 342 (see the axial $\Delta_z$ and torsional $\Delta_\Theta$ movements of FIG. 7). When the optically activatable layer 340 is optically activated, this relative movement will be visible as a gap or misalignment and will serve as a precursor indication that excessive deformation or damage is experienced by the shaft assembly 301.

As shown in FIGS. 8-11, the shaft assembly 801 is similar to the shaft assembly 301 but includes a housing 810 including an extension 811, a portion of which is receivable within a shaft 820, which can be formed of metallic materials or composite materials and a cover 830, which includes a first end 831, a second end 832 and a transition section 833 between the first and second ends 831 and 832. In accordance with embodiments, the transition section 833 of the cover 830 may include different shapes, such as, for example, convex shapes (shown as example in FIG. 8), tapered shapes, concave shapes, etc.

Figure 8:
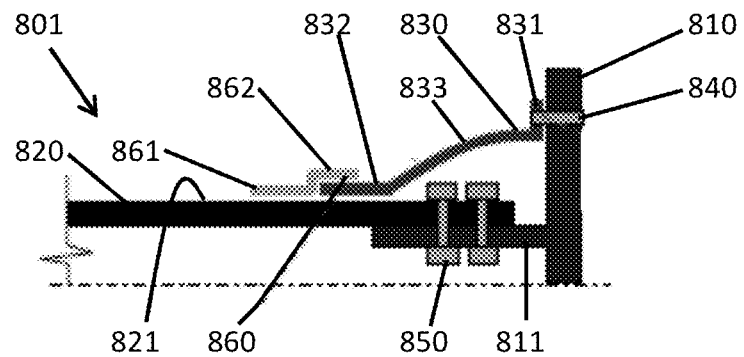
FIG. 8 is schematic axial cross-sectional view of a shaft end joint in accordance with further embodiments.
Figure 9:
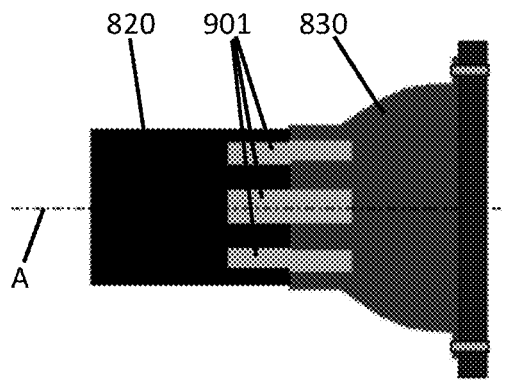
FIG. 9 is schematic side view of an array of stripes of a shaft end joint in accordance with embodiments.

The shaft assembly 801 also includes a first connector 840, a second connector 850 and an optically activatable layer 860. The first and second connectors 840 and 850 can be implemented by different means (e.g., in form of fasteners such as bolts, pins, rivets, etc.) as shown in FIG. 8 or by an appropriate gluing, since no significant load transfer in this connection is expected. The extension 811 secures the shaft 820 and the housing 810 together via the second connector 850 which extends through the extension 811 and the shaft 820. The optically activatable layer 860 is similar to the optical activatable layer 340 and includes a first section 861 and a second section 862. The first section 861 is disposed on an exterior surface 821 of the shaft 820 and the second section 862 is disposed on the second end 832 of the cover 830. The first and second sections 861 and 862 move relative to one another as the shaft 820 and the second end 832 of the cover 830 move relative to one another.

The optically activatable layer 860 can be provided in an array of stripes 901 that are arranged around the shaft 820 and the cover 830. The stripes 901 can be parallel with a central longitudinal axis A of the shaft 820 and the cover 830 or angled (see FIG. 6) relative to the central longitudinal axis A. The stripes 901 can have uniform or variable geometries and may be placed with uniform or variable distances from one another.

Figure 10:
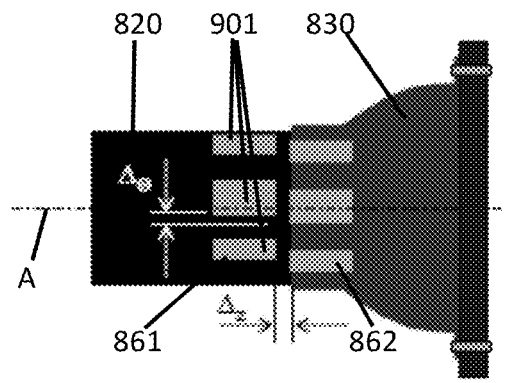
FIG. 10 is schematic side view of an array of stripes exhibiting axial tensile and torsional movements of a shaft end joint in accordance with embodiments.

As shown in FIG. 10, whether the stripes 901 are parallel or angled with respect to the central longitudinal axis A, relative movement between the shaft 820 and the cover 830 will result in a corresponding relative movement of the first section 861 and the second section 862 (see the axial tensile $\Delta_z$ and torsional $\Delta_\Theta$. misalignments of FIG. 10). When the optically activatable layer 860 is optically activated, this relative movement will be visible and will serve as a precursor indication that internal damage is experienced by the shaft assembly 801.

Figure 11:
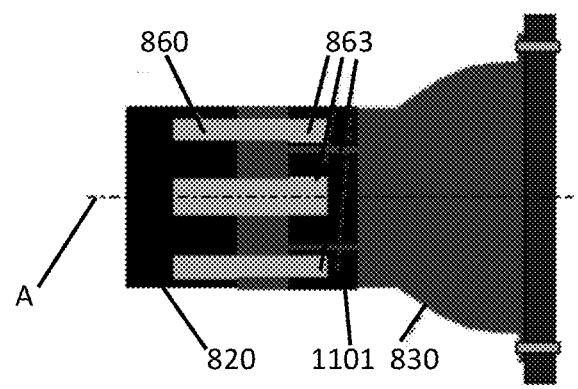
FIG. 11 is schematic side view of an array of stripes exhibiting axial and torsional deformations of a shaft end joint in accordance with embodiments.

With reference to FIG. 11 and in accordance with further embodiments, the second end 832 of the cover 830 may be formed to define an aperture 1101 or an array of apertures 1101 around the shaft 820. In such cases, the optically activatable layer 860 may further include an additional section 863 that is disposed on a portion of the exterior surface 821 of the shaft 820 that is exposed by each aperture 1101. This implementation can be especially helpful in case on potential damage primarily due to axial compression load or/and compressive stresses due to bending. In these cases, relative misalignment between sections 863 and 864 disposed on the optically activatable layer 860 can serve as indication of movement between the cover 830 and the shaft 820.

Figure 12:
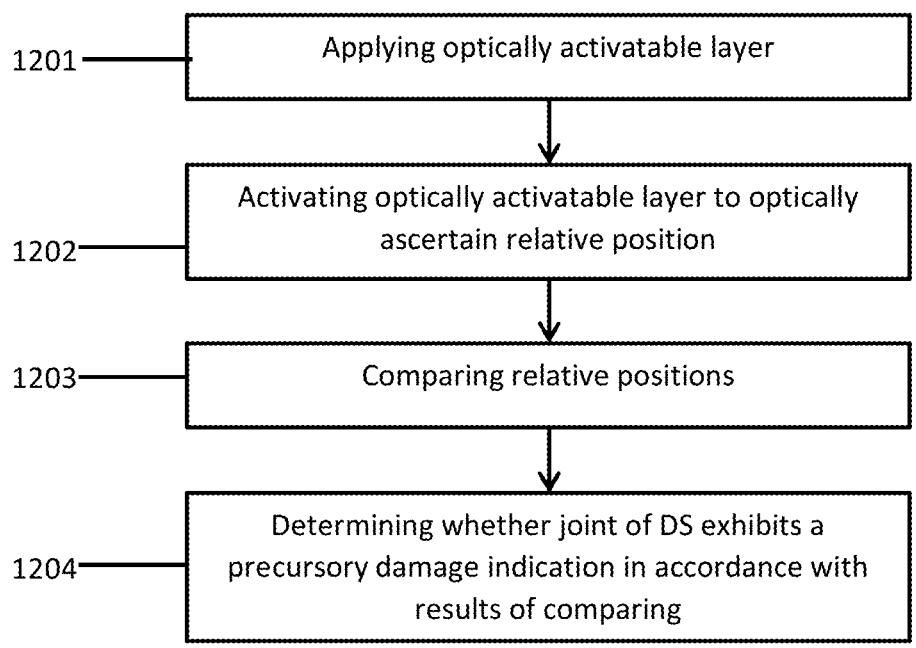
FIG. 12 is a flow diagram illustrating a method of inspecting a joint of an aircraft drive shaft (DS) in accordance with embodiments.

With reference to FIG. 12, a method of inspecting a joint of an aircraft DS at which first and second members are at an initial relative position (i.e., their installation or undamaged position). The method includes applying an optically activatable layer to the joint (1201) by disposing first and second sections of the optically activatable layer on respective exterior surfaces of the first and second members, respectively, such that the first and second sections move relative to one another with relative first and second member movement. After a certain period of time (i.e., a predefined time-in-service), the method also includes repeatedly activating the optically activatable layer to optically ascertain, from relative positions of the first and second sections, a secondary relative position of the first and second members (1202), comparing the secondary and the initial relative positions (1203) and determining whether the joint of the DS exhibits a precursory damage indication in accordance with results of the comparing (1204).

In accordance with embodiments, the optically activatable layer may include at least one of fluorescent, absorbent and reflective materials or coatings or paints and the activating of the optically activatable layer of 1202 may include emitting ultraviolet, visible, or other spectrum light toward these materials, coatings or paints. In addition, the determining of 1204 may include determining that the joint of the DS exhibits the precursory damage indication in accordance with the results of the comparing indicating that the secondary and the initial relative positions are different by a threshold amount.

Technical effects and benefits of the present disclosure are dramatic cost reductions of DS maintenance for designs with composite materials and the ability to have inspections performed by personnel without special training, without complex equipment and without service interruptions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An easily inspected shaft assembly, comprising:
a shaft;
a sleeve receptive of a portion of the shaft; and
an optically activatable layer comprising:
a first optically activatable layer section disposed on an exterior surface of the shaft to move with the shaft; and
a second optically activatable layer sections disposed on an exterior surfaces of the sleeve to move with the sleeve,
wherein the first optically activatable layer section and the second optically activatable layer sections are initially connected and move relative to one another as the shaft and the sleeve move relative to one another.

2. The assembly according to claim 1, wherein at least one of the shaft and the sleeve comprises at least one of metallic materials and composite materials.

3. The assembly according to claim 1, wherein the shaft is secured between the sleeve and an insert.

4. The assembly according to claim 1, wherein the optically activatable layer is fluorescent and visually inspectable.

5. The assembly according to claim 1, wherein:
the optically activatable layer is provided in an array of one or more stripes of uniform or variable geometries arranged around the shaft and the sleeve, and
the one or more stripes are parallel with or angled relative to a central longitudinal axis of the shaft and the sleeve.

6. The assembly according to claim 1, further comprising one or more connections to secure the sleeve and the shaft together.

7. An aircraft, comprising:
an engine;
a gearbox disposed remotely from the engine; and
a drive shaft (DS) configured to transmit torque produced by the engine to the gearbox,
wherein the assembly according to claim 1 is provided as one or more assemblies disposed along a length of the DS.

8. The assembly according to claim 1, wherein:
the shaft and the sleeve are straight,
and the optically activatable layer comprises a step with two opposed right-angles between the first optically activatable layer section and the second optically activatable layer section.

9. The assembly according to claim 1, wherein:
the shaft and the sleeve each comprise a corresponding conically shaped section, and
the optically activatable layer comprises a step with a right angle and an obtuse angle opposing the right angle between the first optically activatable layer section and the second optically activatable layer section.

10. The assembly according to claim 9, further comprising:
a housing including a wedge; and
a connection to connect the sleeve to the housing whereby the conically shaped section of the shaft is interposed between the conically shaped section of the sleeve and the wedge,
wherein there is an absence of a connection between the sleeve and the shaft.

11. An easily inspected shaft assembly, comprising:
a housing comprising an extension;
a shaft which is receptive of a portion of the extension;
a cover; and
an optically activatable layer comprising:
a first optically activatable layer section disposed on an exterior surface of the shaft to move with the shaft; and
a second optically activatable layer sections disposed on an exterior surfaces of the cover to move with the cover,
wherein the first optically activatable layer section and the second optically activatable layer sections are initially connected and move relative to one another as the shaft and the cover move relative to one another.

12. The assembly according to claim 11, wherein at least one of the shaft, the cover and the housing comprises at least one of metallic materials and composite materials.

13. The assembly according to claim 11, wherein the optically activatable layer is fluorescent and visually inspectable.

14. The assembly according to claim 11, wherein:
the optically activatable layer is provided in an array of one or more stripes of uniform or variable geometries arranged around the shaft and the cover, and
the one or more stripes are parallel with or angled relative to a central longitudinal axis of the shaft and the cover.

15. The assembly according to claim 11, wherein the cover is formed to define one or more apertures.

16. The assembly according to claim 15, wherein the optically activatable layer further comprises an additional optically activatable layer section that is disposed on a portion of the exterior surface of the shaft exposed by the one or more apertures.

17. The assembly according to claim 16, wherein:
the cover is formed to define an array of one or more apertures around the shaft, and
the optically activatable layer is provided in an array of one or more stripes arranged around the shaft and the cover with each of the one or more stripes extending into a corresponding aperture.

18. The assembly according to claim 11, further comprising:
one or more first connections to secure the shaft and the extension together; and
one or more second connections to secure the housing and the cover together.

19. An aircraft, comprising:
an engine;
a gearbox disposed remotely from the engine; and
a drive shaft (DS) configured to transmit torque produced by the engine to the gearbox,
wherein the assembly according to claim 8 is provided as one or more assemblies disposed along a length of the DS.

20. The assembly according to claim 11, wherein:
the cover includes a first end, which is coupled to the housing, a second end and a convex transition between the first and second ends,
the second optically activatable layer section is disposed on an exterior surface of the second end of the cover, and
the optically activatable layer comprises a step with two right-angles between the first optically activatable layer section and the second optically activatable layer section.

* * * * *